Dec. 23, 1952        R. P. HORN        2,622,915
GRAPPLE FORK
Filed March 24, 1950        2 SHEETS—SHEET 1
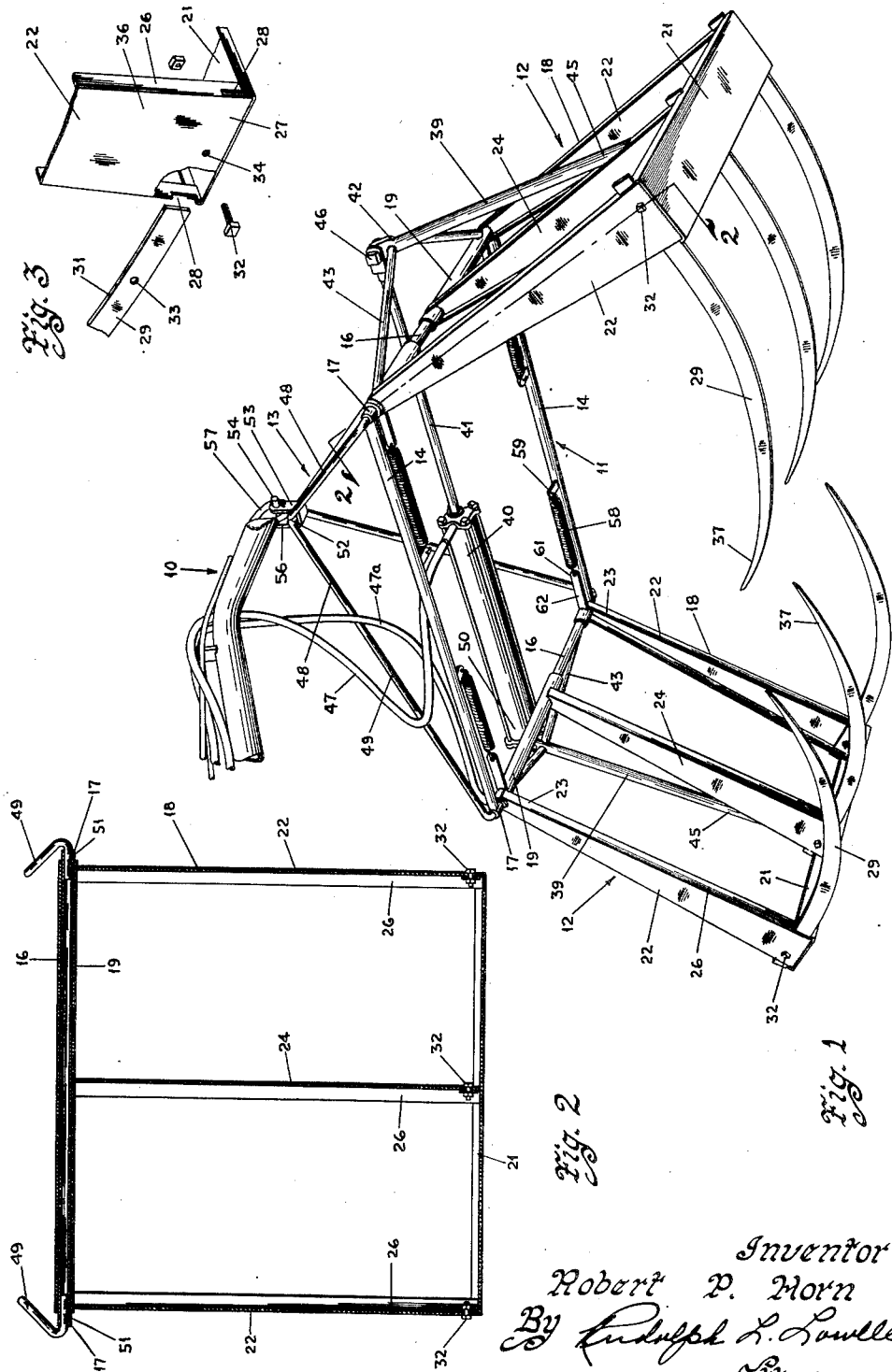
Inventor
Robert P. Horn
By Rudolph L. Lowell
Attorney Dec. 23, 1952     R. P. HORN     2,622,915
GRAPPLE FORK
Filed March 24, 1950     2 SHEETS—SHEET 2
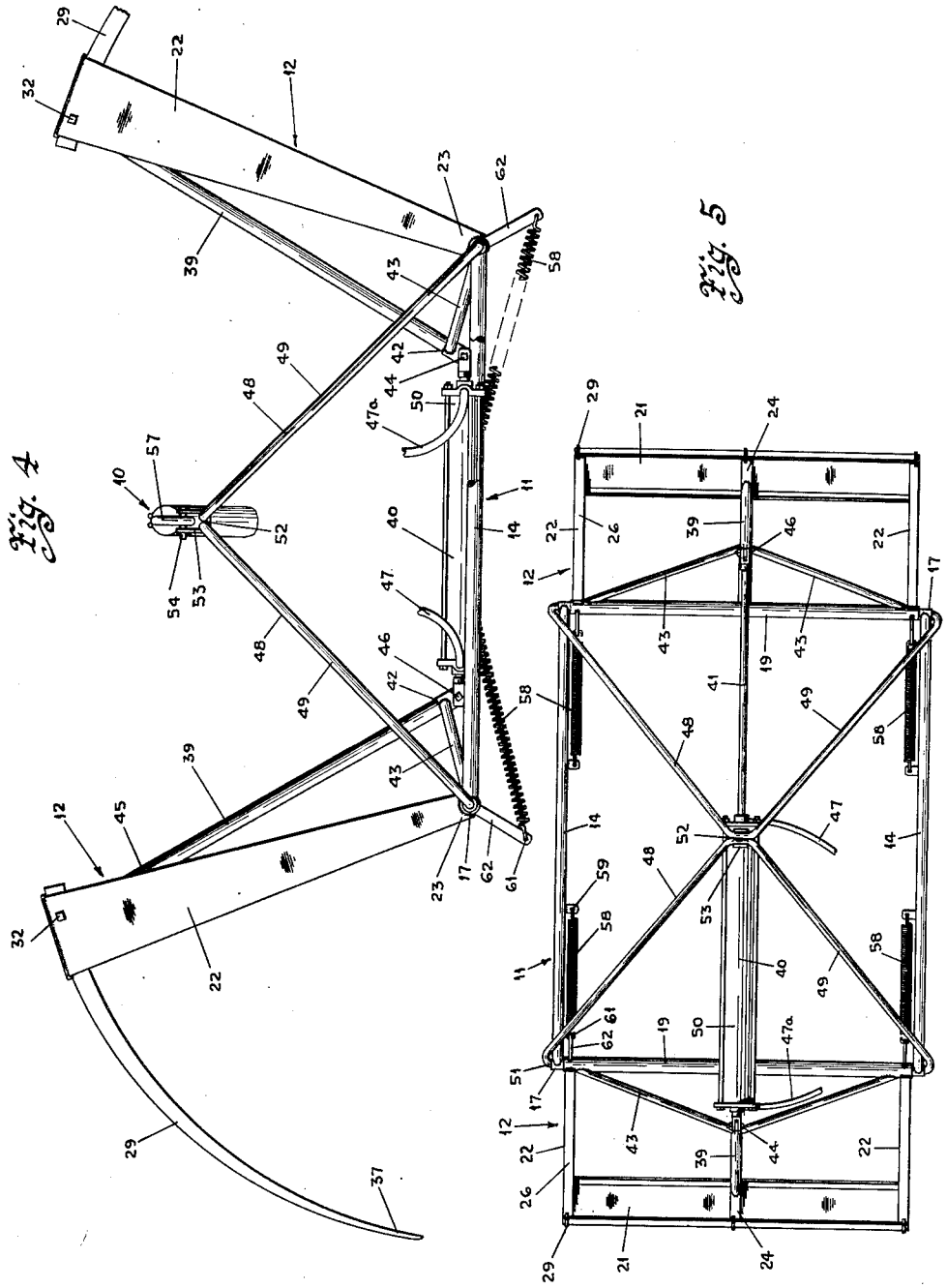
Inventor
Robert P. Horn
By Rudolph L. Lowell
Attorney Patented Dec. 23, 1952

2,622,915

UNITED STATES PATENT OFFICE 2,622,915

GRAPPLE FORK

Robert P. Horn, Fort Dodge, Iowa, assignor to Horn Manufacturing Company, Fort Dodge, Iowa, a corporation of Iowa Application March 24, 1950, Serial No. 151,785

3 Claims. (Cl. 294—88)

This invention relates generally to hay forks and in particular to a grapple fork adapted to be carried on the lift boom of a tractor loader attachment for operation by the tractor oil pump unit.

An object of this invention is to provide an improved grapple fork.

A further object of this invention is to provide a grapple fork in which the cooperating fork units are yieldably held in an unloaded position against relative swinging movement.

Another object of this invention is to provide a grapple fork in which a pair of fork units are of a construction and arranged at opposite ends of the main frame so as to operate in unison by a common hydraulic cylinder extended longitudinally of the main frame.

Yet another object of this invention is to provide a hydraulically operated grapple fork for a tractor loader attachment which is of a rugged and economical construction, easily and quickly attached to and removed from the loader lifting boom, and capable of being efficiently and quickly operated by the oil pump unit on the tractor.

A feature of this invention is found in the provision of a grapple fork in which a horizontal main frame is equipped with a hanger structure adapted to be supported from the lift arm of a tractor loader attachment. A pair of oppositely arranged rockable fork units are mounted at opposite ends of the main frame for up and down movement outwardly from the ends of the main frame, with detachable tines on the fork units being in a fork closing position below the main frame when the fork units are at their lower limits of swinging movement. The swinging movement of the fork units is accomplished by a hydraulic cylinder and piston assembly arranged longitudinally of and above the main frame with its opposite ends pivotally connected to oppositely arranged longitudinal extensions on the fork units.

Further objects, features and advantages of this invention will appear from the following description when taken in connection with the accompanying drawing, in which:

Fig. 1 is a perspective view of the grapple fork of this invention illustrated in assembly relation with the lift boom of a tractor loader, with the fork units being shown in lowered or closed positions and with certain parts being broken away for the purpose of clarity;

Fig. 2 is a sectional view as seen on the line 2—2 in Fig. 1;

Fig. 3 is a fragmentary exploded perspective view showing the assembly of a tine member with a fork unit;

Fig. 4 is a foreshortened side elevational view of a grapple fork showing the fork units in raised or opened positions; and Fig. 5 is a plan view of the grapple fork as shown in Fig. 1.

With reference to the drawing, the grapple fork of this invention is illustrated in Fig. 1 in assembly relation with a lift boom 10 forming part of a loader attachment for a usual farm tractor (not shown) of a type embodying an oil pump unit (not shown). The grapple fork includes a main frame 11 having a pair of oppositely arranged pivoted or rockable fork units 12, and a hanger structure 13 by which the main frame is supported from the lift boom 10.

The main frame 11 is of a tubular construction and of an open rectangular shape with the side members 14 being positioned inwardly of the end members 16 so that the opposite ends 17 of the end members 16 project laterally outwardly from the side members 14, for a purpose to appear later. Since the fork units 12 are of a like construction and similarly assembled relative to the main frame 11, only one of the fork units 12 will be referred to in detail in the following description.

A fork unit 12 includes a frame 18, of a substantially rectangular shape (Figs. 1 and 2), having one end member 19 of a tubular construction and an opposite end member 21 of a channel plate construction. The side members 22, of the frame 18, are of a channel or U-shape in transverse cross section and of a tapered construction with the converged ends 23 thereof being secured to the tubular end member 19. A center longitudinal member 24 of a construction similar to the side members 22 is connected as by welding to the end members 19 and 21.

The tubular end member 19 is of a length to be received between the side members 14 of the main frame 11, and of a size to rotatably support therein an end member 16 of the main frame 11. The concentric assembly relation of a pair of corresponding end members 16 and 19 thus constitutes a pivot support for a corresponding fork unit 12, with the arrangement of an end member 19 between a pair of side members 14 acting to hold a fork unit 12 against movement longitudinally of an end member 16.

The leg sections 26 (Figs. 1, 2 and 3) of each of the longitudinal members 22 and 24 of a fork unit frame 18 are formed at the diverging ends 27 of these longitudinal members with a pair of oppositely arranged upright rectangular openings 28. A tine member 29, corresponding to each of the longitudinal frame members 22 and 24, is curved longitudinally and of a substantially rectangular shape in transverse cross section. On inserting, what will be termed the heel or rear end 31 of a tine 29 within a pair of oppositely aligned openings 28, a tightening bolt 32 is extended through an opening 33 formed in the rear end 31 of a tine member and a hole 34 provided in the base portion 36 of a longitudinal frame member 22 and 24. As the result of the engagement of a tine member 29 with the side walls of a pair of aligned openings 28, only the single clamping bolt 32 is required to hold a tine member 29 in assembly position. The removal of a tine for servicing and replacement purposes is thus easily and quickly accomplished.

As shown in Fig. 1, when the fork units 12 are in their lowermost limits of travel, the tine members 29 are located below the main frame 11 with their free ends 37 closely adjacent to each other so as to close the grapple fork for load-carrying purposes. On movement of the fork units 12 to their upper limits of travel, as shown in Fig. 4, the tine members 29 are arranged at opposite ends of the main frame 11 and with their points or free ends 37 located above the frame 11 and pointed downwardly so as to facilitate their penetration into hay and the like in the loading of the fork.

The swinging movement of the fork units 12, to open and close positions therefor, is accomplished by a double acting hydraulic cylinder 40 (Figs. 1, 4 and 5) having an associated piston 41. Each fork unit 12 has a longitudinal connecting member 39 secured at one end 45 to a central longitudinal member 24 and then inclined outwardly from the member 24 so that its opposite end 42 projects outwardly from the end member 19 and above the main frame 11, when the fork units 12 are in their closed positions. Brace members 43 are connected between the projected end 42 of a supporting member 39 and the opposite ends of a corresponding end member 19. The base end 50 of the cylinder 40 is pivotally connected at 44 to one of the connecting members 39, while the free end of the piston 41 is pivoted at 46 to the other of the connecting members 39.

Fluid is connected to opposite ends of the cylinder 40 through hose connections or oil supply lines 47 and 47a which in turn are connected with the tractor oil power unit. Thus, on admission of oil under pressure through the hose connection 47a the piston 41 is forced outwardly from the cylinder 40 whereby the fork units 12 are moved inwardly toward each other. To open the fork units 12, for dumping purposes, oil under pressure is supplied to the hose connection 47 whereby the piston 41 is moved within the cylinder 40 to its position illustrated in Fig. 4. Thus by merely alternating the supply of oil under pressure to the oil supply lines 47 and 47a the fork units 12 are positively moved to their open and closed positions.

The hanger structure 13 includes a pair of substantially V-shape hanger members 48, of a rod construction, having their leg portions 49 terminating in inwardly projected lateral extensions 51 (Figs. 2 and 5). The extensions 51 are inserted within the opposite ends 17 of the main frame end members 16. The pieces 52 of the hanger members 48 are placed together for reception within a U-shape supporting strap 53. By merely inserting a pin 54 through the leg sections 56 of the U-strap 53 and a ring 57 formed at the free end of the lift boom 10, the grapple fork is detachably connected with the lift boom.

To substantially eliminate any relative swinging movement between the fork units 12 when unloaded and in their positions shown in Fig. 1, each fork unit 12 is equipped with a stabilizing means including a pair of oppositely arranged coil springs 58 having one end connected at 59 to a side member 14 of the main frame 11. The opposite ends of the springs 58 are connected to the free ends 61 of arm members 62 mounted at opposite ends of a tubular member 19 at positions such that when the fork units 12 are in their closed position, the arms 62 are horizontally disposed and in substantial longitudinal alignment with their corresponding springs 58. As a result of this relative arrangement of the arms 62 and springs 58, a swinging movement of the fork units 12 in either direction from their positions shown in Fig. 1, is resisted by the springs 58.

From a consideration of the above description it is seen that the invention provides a grapple fork, which is readily supported from the lift arm of a tractor loader attachment, and capable of being operated from the usual oil power unit on a tractor. The fork units 12 are movable through an arc of substantially one hundred and eighty degrees and positively moved to either of their extreme positions by virtue of their direct connection with a hydraulic cylinder and piston assembly. Further, the fork units 12 in their unloaded positions, and when not acted upon by the hydraulic cylinder 40 are yieldably maintained against relative swinging movement to facilitate the handling of the grapple fork in transport between loading operations.

Although the invention has been described with respect to a preferred embodiment thereof, it is to be understood that it is not to be so limited since changes and modifications can be made therein which are within the full intended scope of this invention, as defined by the appended claims.

I claim:

1. A grapple fork including a main frame, a pair of transverse rock shafts arranged at opposite ends of said frame, fork units supported at one of the ends thereof on said rock shafts, detachable tine members mounted on said fork units, a pair of oppositely arranged extensions on said fork units projected longitudinally beyond the supported ends of said fork units, and a hydraulic cylinder and piston assembly pivotally connected to the projected ends of said extensions for moving said fork units toward and away from each other.

2. A grapple fork including a main frame, a pair of pivoted fork units arranged at opposite ends of said frame, pivot means supporting said fork units at one of their ends on said frame for pivotal movement toward and away from each other, a hydraulic cylinder and piston assembly extended longitudinally of said frame and movably connected to said fork units, lateral projections on said fork units adjacent to said pivot means and arranged substantially normal to said pivot means such that, when the fork units are in closed positions, said projections are horizontally disposed and extended inwardly of said frame, and spring means connected to said frame and to said projections to yieldably restrain said projections against movement in either direction from said horizontally disposed positions.

3. A grapple fork including a main frame of a rectangular shape and of a tubular construction, having the end members thereof projected laterally outwardly beyond the side members thereof, tine supporting frames having tubular transverse members at one of their ends rockably supported on said end members at positions between said side members, longitudinal extensions on said tine supporting frames extended outwardly from said transverse members, a hydraulic cylinder and piston assembly pivotally connected to the free ends of said longitudinal extensions for moving said tine supporting frames toward and away from each other, and a hanger structure for said main frame including a pair of V-shape members having the pieces thereof adjacent to each other and the free ends of the legs thereof inserted within corresponding ends of said end members.

ROBERT P. HORN.

REFERENCES CITED

The following references are of record in the file of this patent:

UNITED STATES PATENTS

| Number | Name | Date |
|---|---|---|
| 169,740 | Taber | Nov. 9, 1875 |
| 1,156,247 | Murrey | Oct. 12, 1915 |
| 1,346,160 | Barlow | July 13, 1920 |
| 1,630,456 | Wehr | May 31, 1927 |
| 2,412,845 | Stevens | Dec. 17, 1946 |